United States Patent
Jiang

(10) Patent No.: US 11,060,700 B2
(45) Date of Patent: Jul. 13, 2021

(54) MOTOR BRAKING SYSTEM OF STAGE LIGHT

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

(*) Notice: Subject to any disclaimer, the term of this patent is extended or adjusted under 35 U.S.C. 154(b) by 0 days.

(21) Appl. No.: 16/738,564

(22) Filed: Jan. 9, 2020

(65) Prior Publication Data
US 2021/0095834 A1 Apr. 1, 2021

Related U.S. Application Data

(63) Continuation of application No. PCT/CN2019/127188, filed on Dec. 20, 2019.

(30) Foreign Application Priority Data

Sep. 30, 2019 (CN) .......................... 201921656841.2

(51) Int. Cl.
    F21V 14/06    (2006.01)
    F21V 14/08    (2006.01)
    F21W 131/406  (2006.01)

(52) U.S. Cl.
    CPC .............. *F21V 14/06* (2013.01); *F21V 14/08* (2013.01); *F21W 2131/406* (2013.01)

(58) Field of Classification Search
    CPC ... F21W 2131/406; F21V 21/30; F21V 14/02; F21V 14/025; F21V 14/06; F21V 14/065; H02P 3/025; H02P 3/04
    See application file for complete search history.

(56) References Cited

U.S. PATENT DOCUMENTS 2,097,537 A * 11/1937 Snyder .................... F21V 21/30
                                                362/426
6,291,951 B1 * 9/2001 Baulier .................... H02P 3/04
                                                318/362

(Continued)

FOREIGN PATENT DOCUMENTS

CN    204810133 U    11/2015
CN    207684787 U    8/2018

(Continued)

OTHER PUBLICATIONS

Ogura Industrial, Permanent Magnet Brake, Apr. 20, 2018, https://www.youtube.com/watch?v=JDCjT5MOs8Y (Year: 2018).*

(Continued)

*Primary Examiner* — Jong-Suk (James) Lee
*Assistant Examiner* — James M Endo
(74) *Attorney, Agent, or Firm* — Lerner, David, Littenberg, Krumholz & Mentlik, LLP

(57) ABSTRACT

A motor braking system of a stage light includes a controlled component, a braking motor that drives the controlled component to move, and a controller, wherein the braking motor includes a motor unit and a braking unit for braking the motor unit; the braking motor is a power-off locking motor; the motor unit and the braking unit are both electrically connected to the controller; and when detecting that the motor unit is powered on, the controller controls the motor unit to provide a holding torque, and controls the braking unit to be powered on to release a locked state.

8 Claims, 4 Drawing Sheets

(56) References Cited

U.S. PATENT DOCUMENTS

| | | | | |
|---|---|---|---|---|
| 6,321,883 | B1* | 11/2001 | Pfann | F16D 55/28 |
| | | | | 188/161 |
| 6,483,268 | B1* | 11/2002 | Cummins | H02P 3/12 |
| | | | | 318/362 |
| 6,633,286 | B1* | 10/2003 | Do | B64D 11/0015 |
| | | | | 345/204 |
| 8,528,878 | B2 | 9/2013 | Knittel | |
| 10,488,024 | B2 | 11/2019 | Venturati | |
| 2004/0165385 | A1* | 8/2004 | Belliveau | F21V 21/15 |
| | | | | 362/272 |
| 2005/0047142 | A1* | 3/2005 | Lui | F21V 21/15 |
| | | | | 362/275 |
| 2006/0006751 | A1* | 1/2006 | Cavarec | H02K 7/106 |
| | | | | 310/77 |
| 2007/0285037 | A1* | 12/2007 | Potter | H02P 3/26 |
| | | | | 318/377 |
| 2008/0062692 | A1 | 3/2008 | Andersen et al. | |
| 2008/0156597 | A1* | 7/2008 | Sasaki | H02P 15/00 |
| | | | | 188/171 |
| 2009/0323363 | A1* | 12/2009 | Evans | F21V 21/15 |
| | | | | 362/386 |
| 2010/0007299 | A1* | 1/2010 | Davis | H02P 23/14 |
| | | | | 318/490 |
| 2011/0164428 | A1 | 7/2011 | Brutsche et al. | |
| 2011/0261568 | A1* | 10/2011 | Dalsgaard | F21V 21/30 |
| | | | | 362/249.03 |
| 2014/0177258 | A1* | 6/2014 | Gebhard | B60R 11/00 |
| | | | | 362/547 |
| 2015/0003099 | A1* | 1/2015 | Rasmussen | G01D 5/145 |
| | | | | 362/523 |
| 2016/0377256 | A1* | 12/2016 | Hansen | F21V 7/045 |
| | | | | 362/268 |
| 2017/0033714 | A1* | 2/2017 | Ono | F16D 1/00 |
| 2017/0063259 | A1* | 3/2017 | Schoenlinner | B60T 13/04 |
| 2017/0130945 | A1* | 5/2017 | Kitano | F21V 21/28 |
| 2018/0313521 | A1 | 11/2018 | Jurik et al. | |
| 2019/0089273 | A1* | 3/2019 | Kirby | F16D 63/008 |

FOREIGN PATENT DOCUMENTS

| | | |
|---|---|---|
| CN | 207750942 U | 8/2018 |
| CN | 208349155 U | 1/2019 |
| WO | 2013142436 A1 | 9/2013 |

OTHER PUBLICATIONS

Jean Pollefliet, Power Electronics: Switches and Converters, Nov. 14, 2017, NPL001 and NPL003 (Year: 2017).*

Ogura Industrial, Power off Permanent Magnet Brake, Apr. 20, 2018, https://ogura-clutch.com/Permanent_Magnet_Brake.php (Year: 2018).*

Extended European Search Report including Written Opinion for Application No. EP19219914.9, dated Aug. 4, 2020, pp. 1-9.

International Search Report for Application No. PCT/CN2019/127188, dated Jun. 10, 2020, pp. 1-5.

* cited by examiner

MOTOR BRAKING SYSTEM OF STAGE LIGHT

CROSS REFERENCE TO RELATED APPLICATIONS

The present application is a continuation of International Application No. PCT/CN2019/127188, filed Dec. 20, 2019, which claims priority from Chinese Patent Application No. 201921656841.2 filed Sep. 30, 2019, all of which are hereby incorporated herein by reference.

TECHNICAL FIELD

The present invention relates to the technical field of stage lights, and more particularly to a motor braking system of a stage light.

BACKGROUND ART

With the development of the stage light technologies, the structure of a stage light is getting more precise, and the running speed of a controlled component of the stage light is getting faster, so that the switching of light effects is becoming faster, for example, rotation of a light holder, and a focus lens, magnifying lens, and cutter inside the light holder.

In an actual use process, a non-standard operation by an operator or sudden power failures, etc. would sometimes cause a stage light to be suddenly powered off, and thus, the controlled component falls down under the action of gravity, causing the controlled component to be damaged due to collision. Brake motors will be used in some stage lights for automatic locking after the power-off, so that the controlled component is kept in an original position to prevent the controlled component from falling down; however, next time the stage light is powered on for use, the controlled component still will fall down after the brake motor is unlocked.

SUMMARY

In order to overcome at least one of the above-mentioned defects in the prior art, the present invention provides a motor braking system of a stage light, to avoid a problem that a controlled component falls down both when the stage light is powered off and powered on.

In order to solve the above-mentioned technical problems, the technical solution used in the present invention is: a motor braking system of a stage light, comprising a controlled component, a braking motor that drives the controlled component to move, and a controller, wherein the braking motor comprises a motor unit and a braking unit for braking the motor unit; the braking motor is a power-off locking motor; the motor unit and the braking unit are connected in parallel with each other and are both electrically connected to the controller; and when detecting that the motor unit is powered on, the controller controls the motor unit to provide a holding torque, and controls the braking unit to be powered on to release a locked state.

By arranging the braking motor having the braking unit, the motor braking system of the stage light locks the motor unit after the stage light is powered off, so that the controlled component is kept in an original position, thereby preventing the controlled component from falling down. In addition, after the stage light is powered on, when detecting that the motor unit is powered on, the controller controls the motor unit to provide a holding torque in advance to keep the controlled component in the origin position without rotation, and controls the braking unit to be powered on to release the locked state, so that the motor unit can start to work normally.

Further, the braking unit is located on one side of the motor unit or is arranged around the motor unit in a direction perpendicular to a rotating shaft of the motor unit. The length of the braking motor in a direction of the rotating shaft is reduced, so as to facilitate reasonable use of the space in the stage light.

Further, the braking motor drives the controlled component to move along a light path.

Further, the controlled component is one of a focus lens and a magnifying lens. Focusing and magnifying are performed on a light beam separately, that is, a divergence angle of the light beam is changed.

Further, the braking motor drives the controlled component to swing or rotate relative to a light path. Therefore, the controlled component gets close to or passes through a light beam, or the controlled component matches the light beam in different positions or different shapes, so as to generate various light effects.

Further, the controlled component is one of a prism, a frost lens, a static gobo wheel, a rotating gobo wheel, a color wheel, a flame wheel, an aperture, and a cutter, which separately generates effects of splitting, frosting, projecting a static gobo, projecting a rotating gobo, dyeing, ring cutting, and multilateral cutting for the light beam.

Further, the controlled component is a light holder, and the braking motor drives the light holder to rotate in a horizontal or vertical direction.

Further, in the locked state of the braking unit, an external force is allowed to forcibly change the position of the controlled component, so that the controlled component is prevented from being damaged by a forcible push, and moreover, the controlled component can also be pushed to a suitable position for maintenance or installation.

Further, the braking unit is of a magnetic attraction type. In the case of power-on, an electromagnetic coil is used to attract a permanent magnet, so that the motor unit is in an unlocked state, and in the case of power-off, the electromagnetic coil releases the permanent magnet automatically, and the permanent magnet attracts a braking disc, so as to lock the motor unit.

Further, the motor braking system further comprises a braking drive unit that controls on and off of the braking unit, wherein the braking drive unit comprises a MOS transistor that controls on and off of an electromagnetic coil of the brake unit and a transistor that controls on and off of the MOS transistor, and the braking unit is electrically connected to the controller by means of the braking drive unit. After detecting that the motor unit is powered on, the controller sends a power-on signal to the braking drive unit, and the braking drive unit enables the braking unit to be powered on, so as to achieve unlocking of the motor unit.

DETAILED DESCRIPTION OF EMBODIMENTS

The accompanying drawings are merely for exemplary illustration and are not to be construed as limiting the present invention. For better illustration of the embodiments, some components in the accompanying drawings may be omitted, scaled up, or scaled down, which does not represent a size of an actual product. It may be understood by a person skilled in the art that some well-known structures and illustration thereof may be omitted in the accompanying drawings. The illustration about location relationships in the accompanying drawings are merely for exemplary illustration and are not to be construed as limiting the present invention.

Figure 1:
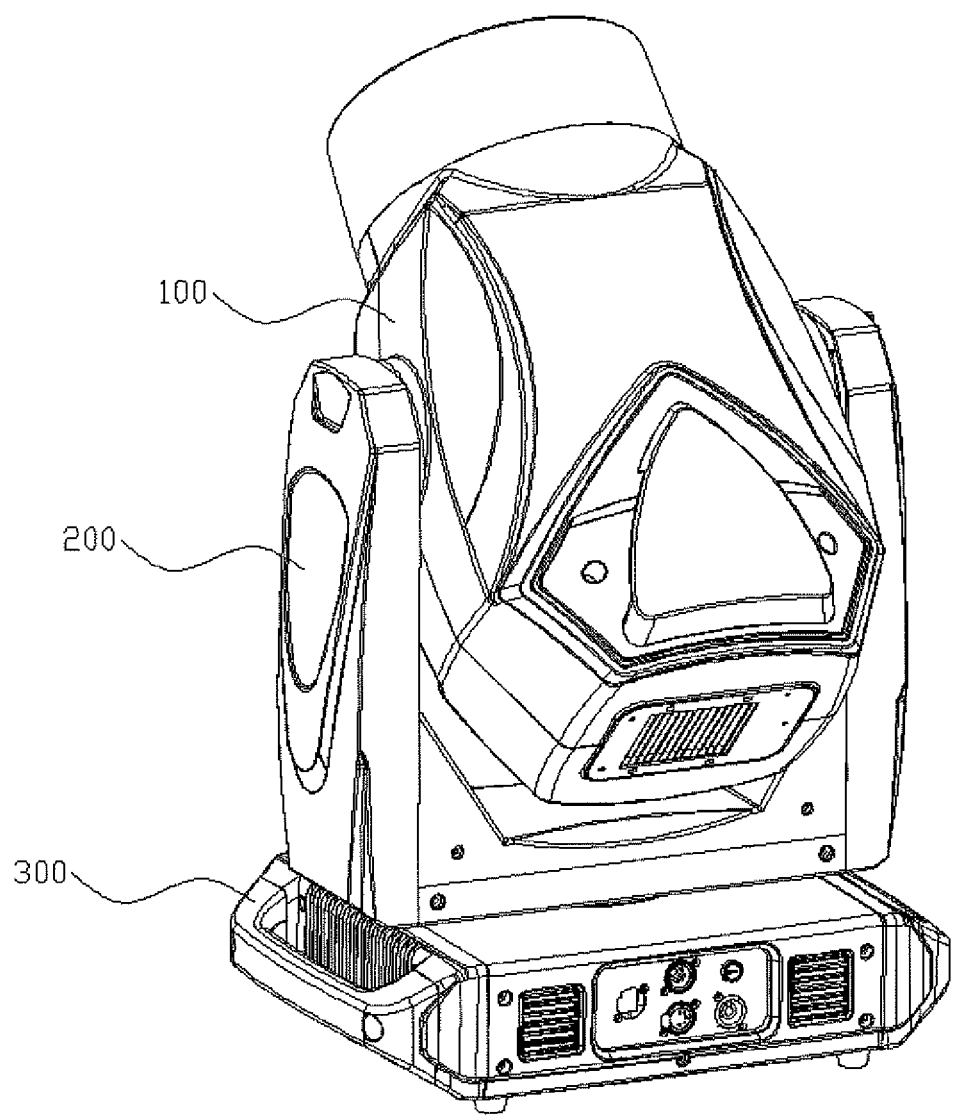
FIG. 1 is a schematic diagram of an overall structure of a stage light of the present invention.
Figure 2:
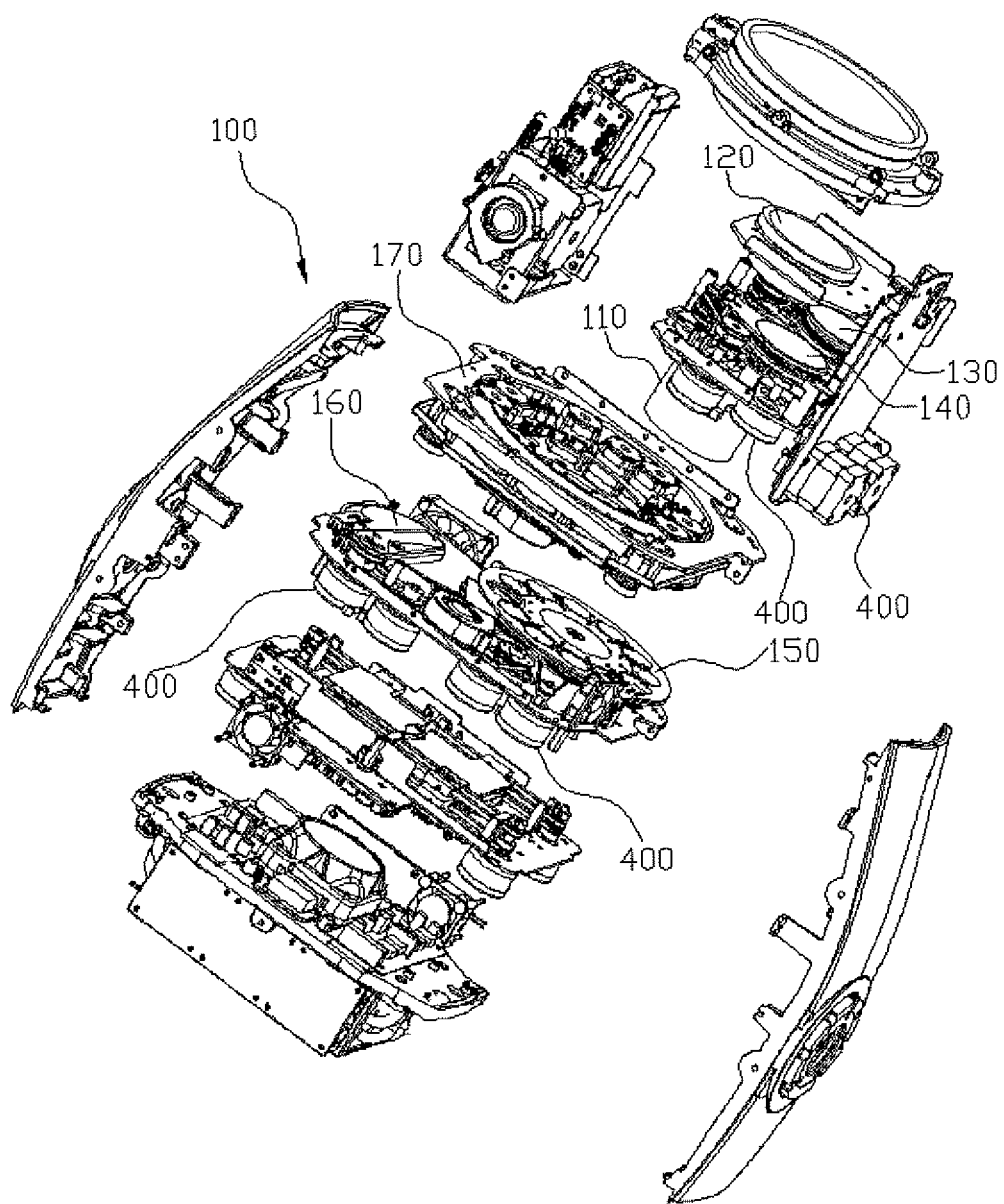
FIG. 2 is a schematic diagram of an inner structure of a light holder of the present invention.
Figure 3:
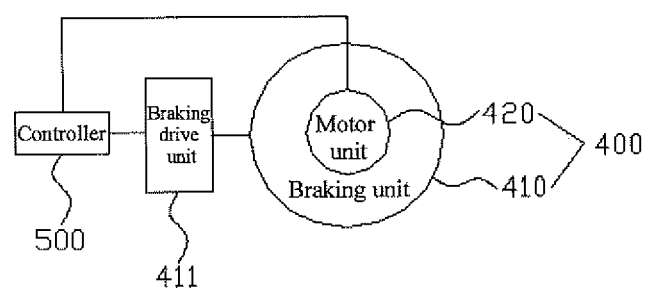
FIG. 3 is a schematic diagram of a control structure of a braking motor of the present invention.

As shown in FIG. 1 to FIG. 3, the present invention provides a motor braking system of a stage light, comprising a controlled component, a braking motor 400 that drives the controlled component to move, and a controller 500, wherein the braking motor 400 comprises a motor unit 420 and a braking unit 410 for braking the motor unit 420; the braking motor 400 is power-off locking motor, which runs normally when powered on, and locks a rotating shaft of the motor unit 420 automatically when powered off; the motor unit 420 and the braking unit 410 are connected in parallel with each other, do not affect each other when powered on and off, and are both electrically connected to the controller 500; and when detecting that the motor unit 420 is powered on, the controller 500 controls the motor unit 420 to provide a holding torque, and controls the braking unit 410 to be powered on to release a locked state.

By arranging the braking motor 400 having the braking unit 410, the motor braking system of the stage light locks the motor unit 420 after the stage light is powered off, and the rotating shaft of the motor unit 420 will not continue to rotate under the action of the gravity or inertia of the controlled component, so that the controlled component is kept in an original position, thereby preventing the controlled component from falling down. In addition, after the stage light is powered on, when detecting that the motor unit 420 is powered on, the controller 500 controls the motor unit 420 to provide a holding torque in advance to keep the controlled component in the origin position without rotation, and controls the braking unit 410 to be powered on to release the locked state, so that the motor unit 420 can start to work normally. The rotating shaft of the motor remains stationary when no external force is applied, and the motor provides the holding torque to withstand the gravity of the controlled component, which is well known to a person skilled in the art. For example, in a process in which the stage light works normally, a focus lens 110 and a magnifying lens 120 are driven by the braking motor 400 to specific positions, and then the holding torque provided by the braking motor 400 is used to keep the focus lens 110 and the magnifying lens 120 in the specific positions, which are techniques frequently used by a person skilled in the art at present.

In a preferred embodiment of the present invention, the braking unit 410 is located on one side of the motor unit 420 or is arranged around the motor unit 420 in a direction perpendicular to the rotating shaft of the motor unit 420. The length of the braking motor 400 in a direction of the rotating shaft is reduced, so as to facilitate reasonable use of the space in the stage light. When necessary, the braking unit 410 may be further arranged at one end of the motor unit 420 that is far away from the rotating shaft, to reduce the width of the braking motor 400.

In a preferred embodiment of the present invention, the braking motor 400 drives the controlled component to move along a light path. Preferably, the braking motor 400 drives a controlled component fixed on a synchronous belt by means of the synchronous belt.

In a preferred embodiment of the present invention, the controlled component is one of the focus lens 110 and the magnifying lens 120. Focusing and magnifying are performed on a light beam separately, that is, a divergence angle of the light beam is changed.

In a preferred embodiment of the present invention, the braking motor 400 drives the controlled component to swing or rotate relative to a light path. Therefore, the controlled component gets close to or passes through a light beam, or the controlled component matches the light beam in different positions or different shapes, so as to generate various light effects. Preferably, a rotating shaft of the braking motor 400 is directly connected to a rotating shaft of the controlled component, so as to drive the controlled component, or a transmission gear and a transmission belt are arranged for driving.

In a preferred embodiment of the present invention, the controlled component is one of a prism 130, a frost lens 140, a static gobo wheel, a rotating gobo wheel 150, a color wheel, a flame wheel 160, an aperture, and a cutter 170, which separately generates effects of splitting, frosting, projecting a static gobo, projecting a rotating gobo, dyeing, ring cutting, and multilateral cutting for the light beam. Structures of the static gobo wheel, the rotating gobo wheel 150, the aperture, and the cutter 170 are known and are not redundantly described herein.

In a preferred embodiment of the present invention, the controlled component is a light holder 100, and the braking motor 400 drives the light holder 100 to rotate in a horizontal or vertical direction. Preferably, the light holder 100 is pivotally connected to a U-shaped arm 200, the U-shaped arm 200 is pivotally connected to a chassis 300, the light holder 100 rotates in a vertical direction on the U-shaped arm 200, the U-shaped arm 200 rotates in a horizontal direction on the chassis 300, and rotation of the light holder 100 in the horizontal direction or vertical direction is driven by one braking motor 400.

In this embodiment, the controller 500 is arranged in the chassis 300.

In a preferred embodiment of the present invention, in the locked state of the braking unit 410, an external force is allowed to forcibly change the position of the controlled component. That is, the motor unit 420 is not completely locked, and can be forcibly driven by an external force of a certain intensity, so that the controlled component is prevented from being damaged by a forcible push, and moreover, the controlled component can also be pushed to a suitable position for maintenance or installation.

In a preferred embodiment of the present invention, the braking unit 410 is of a magnetic attraction type. In the case of power-on, an electromagnetic coil is used to attract a permanent magnet, so that the motor unit 420 is in an unlocked state, and in the case of power-off, the electromagnetic coil releases the permanent magnet automatically, and the permanent magnet attracts a braking disc, so as to lock the motor unit 420. Because the magnetic attraction type braking motor 400 is a conventional element that can be purchased on the market at will, which will not be redundantly described herein.

In a preferred embodiment of the present invention, the motor braking system further comprises a braking drive unit 411 that controls on and off of the braking unit 410, wherein the braking drive unit 411 comprises a MOS transistor that controls on and off of an electromagnetic coil of the brake unit and a transistor that controls on and off of the MOS transistor, and the braking unit 410 is electrically connected to the controller 500 by means of the braking drive unit 411. After detecting that the motor unit 420 is powered on, the controller 500 sends a power-on signal to the braking drive unit 411, and the braking drive unit 411 enables the braking unit 410 to be powered on, so as to achieve unlocking of the motor unit 420.

Figure 4:
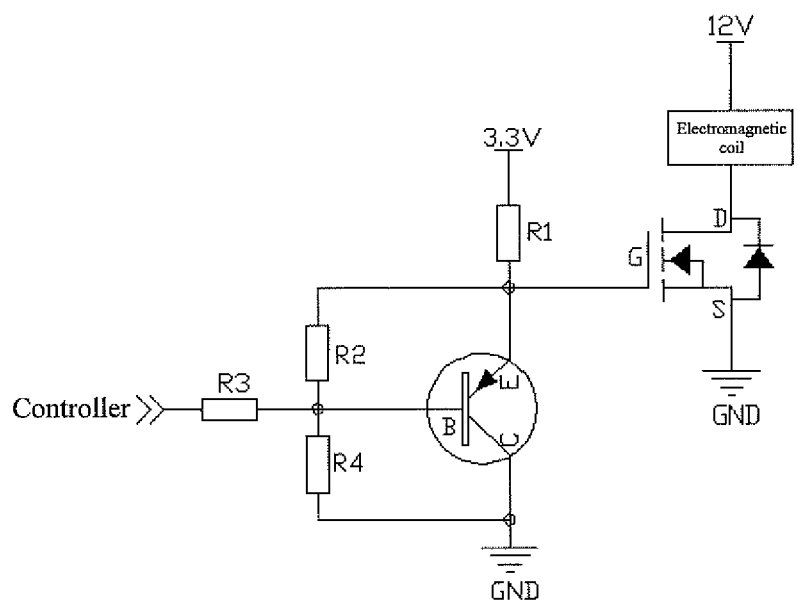
FIG. 4 is a schematic diagram of a circuit structure of a braking drive unit of the present invention.

As shown in FIG. 4, specifically, a B electrode of the transistor is connected to the controller 500 through a resistor R3, an E electrode of the transistor is connected to a 3.3 V voltage through a resistor R1, a C electrode of the transistor is grounded, and at the same time, the E electrode of the transistor is connected to the B electrode through a resistor R2, and the C electrode of the transistor is connected to the B electrode through a resistor R4; and a G electrode of the MOS transistor is connected to the E electrode of the transistor, an S electrode is grounded, and a D electrode is connected to the electromagnetic coil; and the other end of the electromagnetic coil is connected to a 12 V voltage, a positive electrode of a diode is connected to the S electrode of the MOS transistor, and a negative electrode is connected to the D electrode of the MOS transistor. Resistance values of the resistor R1, the resistor R2, the resistor R3, and the resistor R4 are respectively of 1KΩ, 10 KΩ, 1 KΩ, and 1 KΩ.

Obviously, the above-mentioned embodiments of the present invention are merely examples made for clearly describing the present invention, but do not limit implementations of the present invention. For a person of ordinary skill in the art, other forms of changes or variations may also be made on the basis of the above-mentioned illustration. There is no need and no way to exhaust all implementations here. Within the spirit and principle of the present invention, any modifications, equivalent replacements, improvements, etc., shall be comprised within the scope of protection of the present invention.

The invention claimed is:

1. A motor braking system of a stage light, comprising
a controller;
a chassis;
a U-shaped arm being pivotally connected to the chassis;
a light holder being pivotally connected to a U-shaped arm,
wherein a focus lens or a magnifying lens is provided in the light holder, a first braking motor is provided in the light holder to control the focus lens or the magnifying lens to move along a light path of the stage light,
wherein the first braking motor is of a magnetic attraction type motor,
wherein the first braking motor comprises a motor unit and a braking unit for braking the motor unit, the first braking motor is a power-off locking motor;
wherein the motor unit and the braking unit are electrically connected in parallel with each other and are both electrically connected to the controller, and
wherein when detecting that the motor unit is powered on, the controller controls the motor unit to provide a holding torque, and then controls the braking unit to be powered on to release a locked state.

2. The motor braking system of the stage light according to claim 1, wherein the braking unit is located on one side of the motor unit or is arranged around the motor unit in a direction perpendicular to a rotating shaft of the motor unit.

3. The motor braking system of the stage light according to claim 1, wherein at least one of a prism, a frost lens, a static gobo wheel, a rotating gobo wheel, a color wheel, a flame wheel, an aperture, and a cutter is further provided in the light holder, each of which is controlled to swing or rotate relative to the light path by a respect second braking motor, the second braking motor has a same structure with the first braking motor.

4. The motor braking system of the stage light according to claim 3, wherein a rotation shaft of the respect second braking motor is connected to a rotation shaft of the at least one of the prism, the frost lens, the static gobo wheel, the rotating gobo wheel, the color wheel, the flame wheel, the aperture, and the cutter.

5. The motor braking system of the stage light according to claim 1, wherein a third braking motor and a fourth braking motor are further provided to control the light holder to respectively rotate in a horizontal or vertical direction, and the third braking motor and the fourth braking motor have the same structure with the first braking motor.

6. The motor braking system of the stage light according to claim 1, wherein in the locked state of the braking unit, an external force is allowed to forcibly change the position of the focus lens or the magnifying lens.

7. The motor braking system of the stage light according to claim 1, wherein in the locked state of the braking unit, an external force is allowed to forcibly change the position of the at least one of a prism, a frost lens, a static gobo wheel, a rotating gobo wheel, a color wheel, a flame wheel, an aperture, and a cutter.

8. The motor braking system of the stage light according to claim 1, a braking drive unit is further provided which is configured to control on and off of the braking unit, wherein the braking drive unit comprises a MOS transistor that controls on and off of an electromagnetic coil of the brake unit and a transistor that controls on and off of the MOS transistor, and the braking unit is electrically connected to the controller by the braking drive unit.

\* \* \* \* \*